Patented Aug. 29, 1950

2,520,429

UNITED STATES PATENT OFFICE 2,520,429

PROCESS FOR COLORING AQUEOUS EMULSIONS OF RESINS

Harold F. Park, East Longmeadow, and Francis J. Pokigo, Ludlow, Mass., assignors to Monsanto Chemical Company, St. Louis, Mo., a corporation of Delaware No Drawing. Application February 16, 1949, Serial No. 76,851

4 Claims. (Cl. 260—23.5)

This invention relates to a process for coloring vinylidene polymers and copolymers. More particularly, the invention relates to a method for coloring vinylidene polymers and copolymers in aqueous emulsion form.

One of the best ways for preparing vinylidene polymers and copolymers is to polymerize the monomers in aqueous emulsion in the presence of an emulsifying agent and a suitable polymerization catalyst. The polymerized material is colorless and remains emulsified in the aqueous medium until steps are taken to remove the water therefrom. In commercial practice, a large amount of the polymers and copolymers thus obtained must be colored since one of the outstanding advantages of polymeric materials is the multitude of colors available therein.

Several ways have been suggested for incorporating color into vinylidene polymers, most of which require that the polymer be dried and subjected to a further processing step. It has also been suggested that an oil-soluble organic dye be added to a volatile material which is a non-solvent for the polymer and the dye solution thus formed be incorporated in the aqueous emulsion of the polymer or copolymer. This process has the advantage that the color may be added to the emulsion and thoroughly dispersed throughout the resin by simple agitating means before the emulsion is resolved and the polymer is obtained in a dried form. However, it has been found that the volatile non-solvent has a tendency to upset the balance in the emulsion resulting in premature coagulation so that the old step of treating the polymer on hot milling rolls has been necessary to disperse the color. In addition, it has also been found that it is quite difficult to remove all of the volatile non-solvent with the result that the polymer obtained therefrom is softer than normal and tends to shrink on standing over long periods of time.

One object of this invention is to provide a process for coloring vinylidene polymers and copolymers.

A further object is to provide a process for adding color to aqueous emulsions of vinylidene polymers and copolymers.

These and other objects are attained by dissolving an oil-soluble organic dyestuff in an aliphatic acid containing from 6 to 20 carbon atoms, adding an amine to the dye solution thus obtained, emulsifying the product in water and adding the emulsion thus obtained to an aqueous emulsion of a vinylidene polymer or copolymer.

The following examples are given in illustration and are not intended as limitations on the scope of this invention. Where parts are mentioned, they are parts by weight.

*Example I*

A solution of Condensation Red (Color Index No. 258) in stearic acid was prepared by heating 30 parts of stearic acid until it was in liquid form and then adding 1 part of Condensation Red to the molten acid with constant agitation. After all of the color was dissolved, 15.0 parts of triethanol amine were added to the hot solution. To this mixture 500 parts of water, which had been preheated to about 180° F., was added slowly with constant agitation until an emulsion of the color in water was obtained.

The emulsion of the Condensation Red was then added to an aqueous emulsion of polystyrene in the ratio of 2 parts of color emulsion to 100 parts of polystyrene emulsion. The mixture was agitated until the color emulsion was thoroughly dispersed throughout the polystyrene emulsion. The colored polystyrene emulsion was then agitated at high speeds at room temperature until coagulation occurred. Coagulation was first observed after 64 minutes which compares favorably with an uncolored polystyrene emulsion which coagulated after 66 minutes.

The product was a thick paste of colored polystyrene in water. The water was removed from the paste by drying it in an oven at about 100° C. The dried powder was easily molded by injection or compression molding methods and yielded articles which were uniformly colored and had the same hardness and dimensional stability as uncolored polystyrene.

The polystyrene emulsion used in the example was prepared by polymerizing styrene monomer in an aqueous medium containing a sodium salt of mahogany acids as emulsifier and ammonium persulfate as a catalyst. The final emulsion contained about 40% solids by weight.

When attempts were made to color the same polystyrene emulsion with solutions of Condensation Red in acetone and in dioxane, both of which are volatile non-solvents for polystyrene, the colored emulsions coagulated in a much shorter time, i. e., 40 minutes for the acetone solution and 37 minutes for the dioxane solution.

Both of the coagulated emulsions were dried in ovens at about 100° C. and then molded by injection molding methods. The color of the molded objects was not uniform and the objects shrank on aging. The objects made from the colored polystyrene in which dioxane was used as a solvent for the dye were noticeably softer than normal polystyrene.

*Example II*

In this example an aqueous emulsion of a copolymer of polystyrene and alpha methyl styrene (95% styrene) containing 40% solids by weight was colored by the addition thereto of an emulsion of Oil Yellow OB (Color Index No. 61). The coagulation time of the colored emulsion was substantially the same as that of the uncolored emulsion. The dye emulsion was made by dissolving 2 parts of Oil Yellow OB in 30 parts of oleic acid, adding 14 parts of octylamine and emulsifying the mixture in 500 parts of water. 2 parts of the color emulsion was used to color 100 parts of the copolymer emulsion.

*Example III*

An aqueous emulsion of a copolymer of vinyl chloride and diethyl maleate (90% vinyl chloride by weight) was colored with an emulsion prepared by dissolving 4 parts of Fast Orange A (Color Index 24) in 30 parts of palmitic acid at a temperature at which the acid is in the liquid state, adding 16 parts of diethanolamine to the solution and then adding hot water to the mixture with constant agitation until an emulsion was formed. 6 parts of the color emulsion were added to 100 parts of the vinyl chloridediethyl maleate copolymer emulsion. The colored copolymer emulsion had substantially the same coagulation time as the uncolored copolymer emulsion.

Each of the colored polymer of copolymer emulsions of the examples was dried on drum driers and the dry resin thus obtained was molded in injection molding machines under conventional conditions. The molded objects were uniform in color throughout with no highly colored or uncolored spots observable in any of the individual molded pieces.

The process of this invention may also be used to color polymer and copolymer emulsions which are to be used for coating and adhesive purposes. For such uses the final emulsions are quite stable to coagulation and are substantially unaffected in this respect by the addition of the dye emulsion. Films and coatings prepared from the stable emulsions colored by the process of this invention show a uniform coloration without the presence of color specks or uncolored portions.

*Example IV*

A 40% solids polystyrene emulsion was prepared by polymerizing styrene in an aqueous medium in the presence of ammonium oleate and the sodium salt of a styrene-maleic anhydride copolymer as emulsifying agents and ammonium persulfate as the polymerization catalyst. The resultant emulsion was stable to coagulation over a period of weeks and could be used to coat a film of polystyrene on wood, metal and other surfaces. To 100 parts of this emulsion, there were added 4 parts of the color emulsion prepared as shown in Example I. The colored polystyrene emulsion thus obtained had substantially the same stability as the uncolored emulsions and films coated onto wood or metal surfaces showed an even, homogeneous coloring.

The resins which may be colored by the process of this invention are polymers and copolymers of vinylidene compounds which may be polymerized in aqueous emulsion, i. e., compounds which are substantially insoluble in water. The process may also be applied to vinylidene polymers and copolymers made by methods other than the aqueous emulsion polymerization process provided that the resins are subsequently emulsified in water. Resins which may be colored by the process of this invention are polymers and copolymers of: vinyl esters including vinyl acetate, vinyl propionate, vinyl butyrate, vinyl valerate, vinyl laurate, vinyl stearate, vinyl benzoate, vinyl furoate, etc.; vinyl ethers such as vinyl methyl ether, vinyl ethyl ether, vinyl propyl ether, vinyl butyl ether, vinyl phenyl ether, divinyl ether, etc.; vinyl halides including vinyl chloride, vinyl fluoride, vinyl bromide and vinyl iodide; vinyl amides and imides such as N-vinyl phthalimide, N-vinyl adipamide, N-vinyl succinimide, vinyl carbazole, etc.; acrylic and α-substituted acrylic acids and their derivatives including esters, amides and nitriles thereof such as acrylic, methacrylic, ethacrylic, phenylacrylic acids, and the corresponding nitriles, acrylamide, methacrylamide, phenylacrylamide and their N-substituted derivatives such as N-methyl acrylamide, N,N-diethyl methacrylamide, and the methyl, ethyl, butyl, phenyl, cyclohexyl, etc. esters of acrylic, methacrylic, ethacrylic, phenylacrylic, etc. acids; allyl compounds corresponding to the vinyl compounds including allyl alcohol, allyl esters, allyl acetate, allyl caproate, allyl ethers, allyl ethyl ether, allyl butyl ether, diallyl ether, allyl vinyl ether, allyl halides, allyl chloride, allyl fluoride, etc.; unsaturated polymerizable hydrocarbons such as butadiene, isoprene, piperylene, ethylene, propylene, isobutylene, styrene, ring-substituted styrenes, o-, m-, or p-chloro-styrenes, o-, m-, or p-methyl, ethyl or butyl styrenes, 2,5-dichlorostyrene, 2,5-difluorostyrene, o,p-dimethyl styrene, side-chain substituted styrenes, α-methyl styrene, α-propyl styrene, α-phenyl styrene, α-methyl-p-methyl styrene, vinyl naphthalene, divinyl benzene, etc.; polymerizable α, β- unsaturated polybasic acids and their derivatives such as maleic citraconic, fumaric, itaconic, etc., acids and their esters and amides inluding the mono- and di-methyl, ethyl, butyl, phenyl, etc. esters, maleic acid amide, itaconic acid amide, N-methyl maleic acid amide, N,N-diethyl itaconic acid amide, etc. Polyvinyl acetals and ketals which are not made by an emulsion polymerization process may be emulsified in water and then colored by the process of this invention.

The colors which may be used to modify the resin emulsions are oil-soluble organic dyes which are soluble in aliphatic acids containing 6–20 carbon atoms. Exemplary of the dyes which may be used are: aniline-azo-naphthyl amine yellow (C. I. 22), Fast Orange A (C. I. 24), Oil Scarlet LB (C. I. 248), Sudan Red IV also known as Condensation Red (C. I. 258), Brilliant Fast Brown B, Spirit Yellow R (C. I. 17), Oil Yellow OB (C. I. 61), and many others, the names and nature of which may be easily ascertained by consulting the Color Index. Mixtures of two or more of these colors may be used to obtain various shadings and hues.

The oil-soluble dyes may be dissolved in any aliphatic acid containing from 6 to 20 carbon atoms including saturated and unsaturated acids. Among the acids which may be used are: caproic, heptoic, caprylic, nonylic, capric, undecylic, tridecylic, nondecylic and arachidic acids. Especially important for the process of this invention are the saturated and unsaturated aliphatic acids containing from 15 to 18 carbon atoms since these acids not only act as solvents for the dyes but also are important aids to the emulsification thereof. Among the preferred acids are: stearic, palmitic, oleic, linoleic, linolenic, palmitolic, elaidic, pentadecylic, margaric, etc., acids. Many of the preferred acids are solids at room temperatures and should be heated to above their melting points to readily dissolve the dyes. In such an event the water used as the emulsifying medium should also be heated to a point above the melting point of the acid until the emulsification is completed.

After the dye has been dissolved in the acid, at least a portion and preferably all of the acid should be neutralized with an amine. Aliphatic monoamines including the aliphatic alcohol amines are the preferred neutralizing agents with the added restriction that they should be substantially non-volatile at the temperatures used in carrying out this invention, i. e., up to about 150° C. Among the amines which may be used are mono-, di-, and triethanol amines, and the corresponding butanol amines, mono-, di- and trialkyl amines containing at least 4 carbon atoms in the alkyl group such as the butyl amines, amyl amines, hexylamines, octyl amines, decyl amines, octadecyl amines, etc. A mixture of amines may be used.

The amount of dye to be incorporated in the acids will depend on the strength and solubility thereof and to some extent on the color desired in the finished product although the latter limitation is more a function of the amount of color emulsion which is added to the resin emulsion. For efficient coloring action, from 1 to 10 parts of oil-soluble dye will be dissolved in 100 parts of the acids.

The amount of amine used may be varied between 0.1 to 1.5 mols per mol of acid. Usually, it will be found convenient to add from 0.5 to 1.0 mol of amine per mol of acid.

The amount of color emulsion added to the resin emulsion may be varied substantially depending on the strength of the dye, the amount of dye in the color emulsion, etc. Since the process is applicable to the production of very light tints as well as highely colored materials, the amount of the color emulsion used is not critical. However, for economic reasons it is desirable to prepare the color emulsion in concentrated form and to use fgrom 1 to 10 parts of color emulsion per 100 parts of resin emulsion.

The process of this invention is especially valuable in the coloration of emulsions of vinylidene polymers and copolymers since it provides a method for obtaining uniform and homogeneous colored resins which may be used in injection molding processes, film casting processes or in coating processes. The invention eliminates the tedious and often difficult steps of adding color to the resins in Banbury mixers, on hot milling rolls or by other conventional means of adding color to the resins.

It is obvious that many variations may be made in the products and processes of this invention without departing from the spirit and scope thereof as defined in the appended claims.

What is claimed is:

1. A process for the coloration of vinylidene polymers which comprises adding to an aqueous emulsion of a vinylidene polymer an emulsion of an oil-soluble organic dye, said dye emulsion having been produced by dissolving the dye in a non-volatile aliphatic acid containing from 6 to 20 carbon atoms, adding to the solution thus formed from 0.1 to 1.5 mols of a non-volatile aliphatic monoamine per mol of acid and then emulsifying the mixture with water.

2. A process as in claim 1 wherein the acid contains from 15 to 18 carbon atoms.

3. A process as in claim 1 wherein the acid is stearic acid.

4. A process as in claim 1 wherein the acid is stearic acid and the amine is triethanolamine.

HAROLD F. PARK.
FRANCIS J. POKIGO.

REFERENCES CITED

The following references are of record in the file of this patent:

UNITED STATES PATENTS

| Number | Name | Date |
| --- | --- | --- |
| 1,660,213 | Teague | Feb. 21, 1928 |